Figure 1:
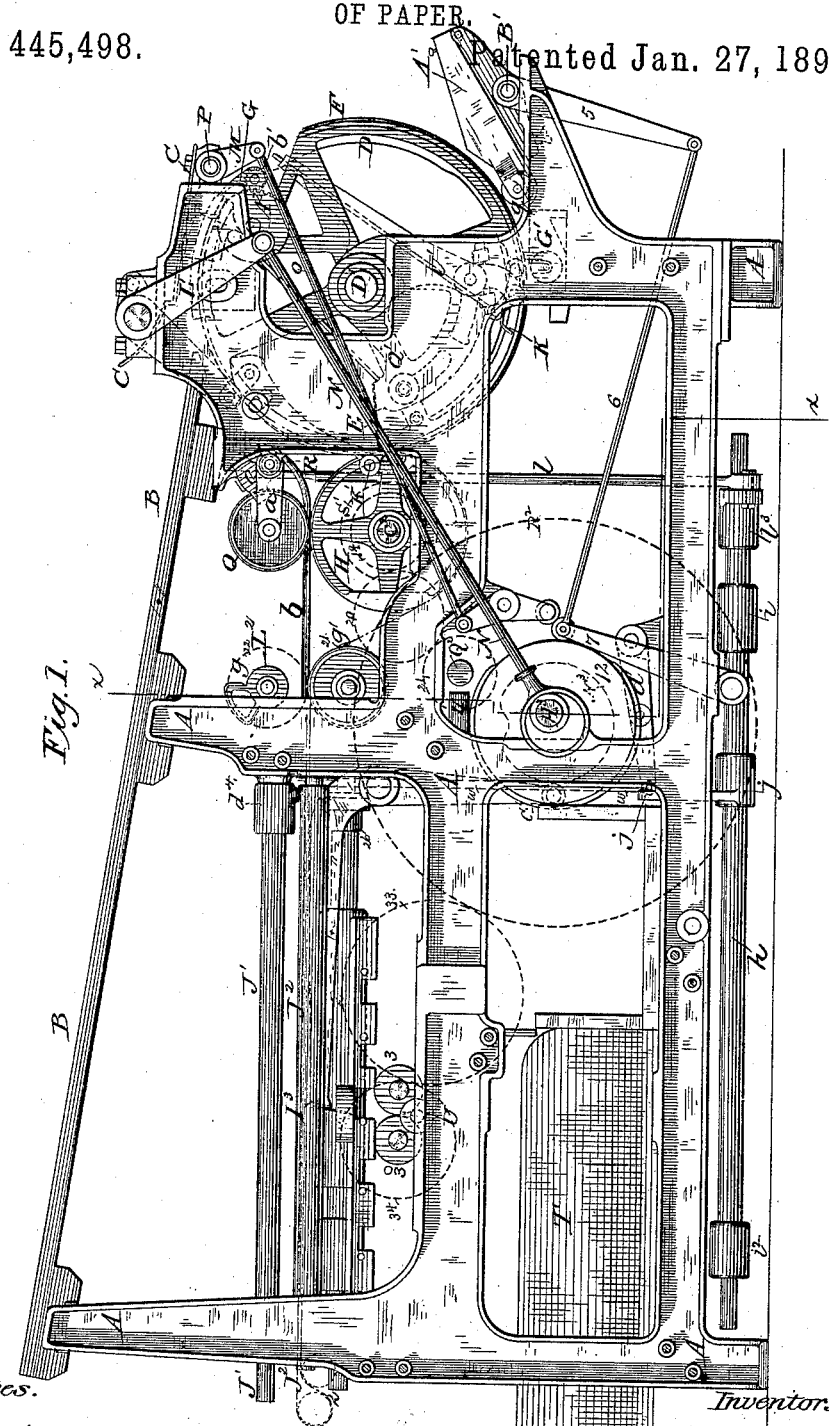

(No Model.)  15 Sheets—Sheet 1.
C. CHAMBERS, Jr., W. MENDHAM & T. C. DAMBORG.
MACHINE FOR FOLDING, PASTING, TRIMMING, AND COVERING SHEETS OF PAPER.

No. 445,498. Patented Jan. 27, 1891.

Witnesses.
Inventors:

(No Model.) 15 Sheets—Sheet 2.
C. CHAMBERS, Jr., W. MENDHAM & T. C. DAMBORG.
MACHINE FOR FOLDING, PASTING, TRIMMING, AND COVERING SHEETS OF PAPER.

No. 445,498. Patented Jan. 27, 1891.

WITNESSES:
INVENTORS:

(No Model.) 15 Sheets—Sheet 4.
C. CHAMBERS, Jr., W. MENDHAM & T. C. DAMBORG.
MACHINE FOR FOLDING, PASTING, TRIMMING, AND COVERING SHEETS OF PAPER.

No. 445,498. Patented Jan. 27, 1891.

Witnesses.
John Burkharitt
Wm H Carson

Inventors:
Cyrus Chambers Jr
William Mendham
Thorvald C Damborg
per Joshua Pusey, atty (No Model.) 15 Sheets—Sheet 6.
C. CHAMBERS, Jr., W. MENDHAM & T. C. DAMBORG.
MACHINE FOR FOLDING, PASTING, TRIMMING, AND COVERING SHEETS OF PAPER.

No. 445,498. Patented Jan. 27, 1891.

Witnesses
Inventors:

(No Model.) 15 Sheets—Sheet 7.
C. CHAMBERS, Jr., W. MENDHAM & T. C. DAMBORG.
MACHINE FOR FOLDING, PASTING, TRIMMING, AND COVERING SHEETS OF PAPER.

No. 445,498. Patented Jan. 27, 1891.

Witnesses.
John Burkhardt.
Wm. H. Carson.

Inventors:
Cyrus Chambers, Jr.
William Mendham,
Thorwald C. Damborg
per Joshua Pusey, atty.

(No Model.) 15 Sheets—Sheet 8.
C. CHAMBERS, Jr., W. MENDHAM & T. C. DAMBORG.
MACHINE FOR FOLDING, PASTING, TRIMMING, AND COVERING SHEETS OF PAPER.

No. 445,498. Patented Jan. 27, 1891.

Witnesses.
John Burkhardt.
Wm. D. Carson.

Inventors:
Cyrus Chambers, Jr.
William Mendham
Thorwald C. Damborg
per Joshua Pusey, atty

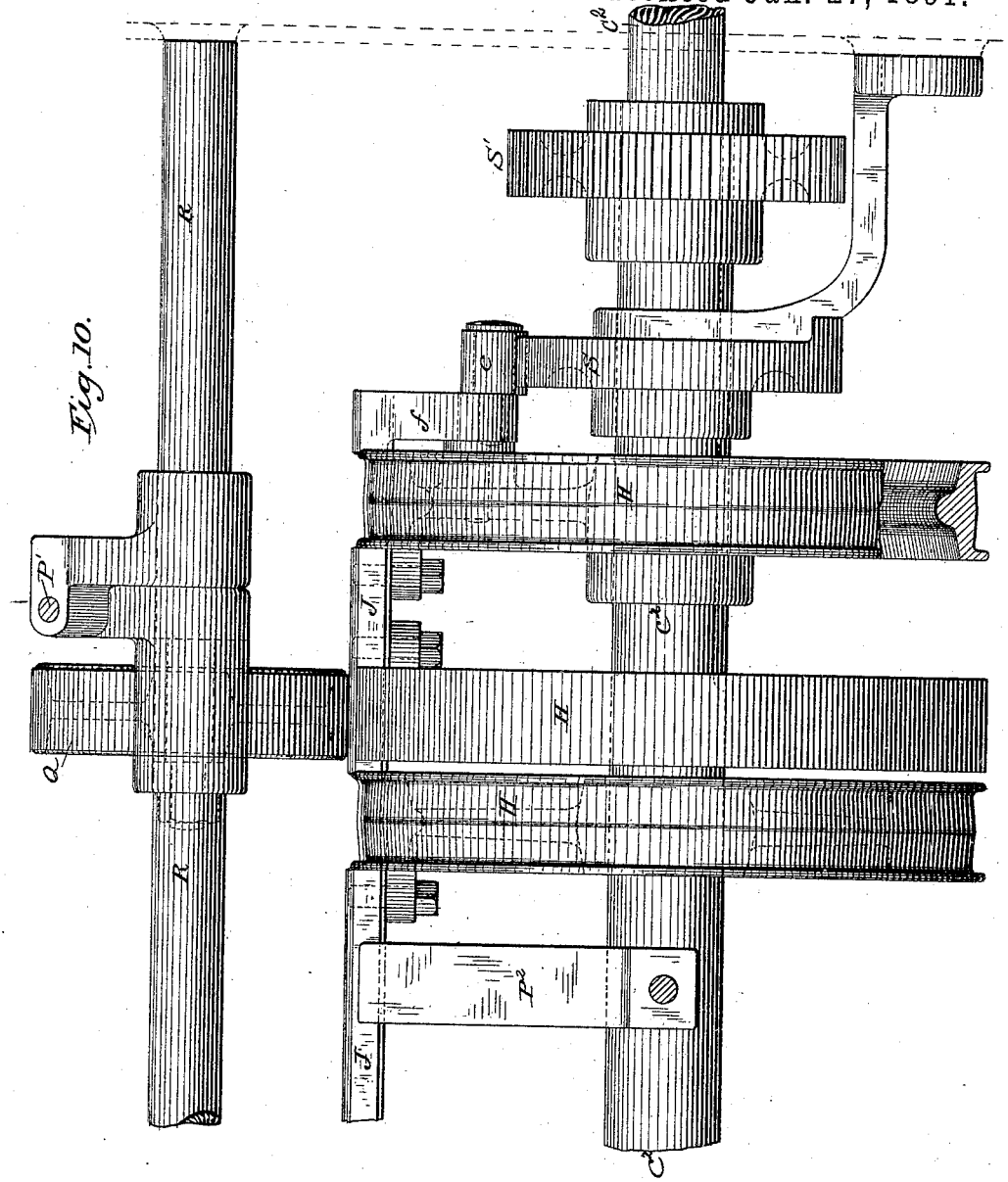

(No Model.) 15 Sheets—Sheet 10.
C. CHAMBERS, Jr., W. MENDHAM & T. C. DAMBORG.
MACHINE FOR FOLDING, PASTING, TRIMMING, AND COVERING SHEETS OF PAPER.
No. 445,498. Patented Jan. 27, 1891.
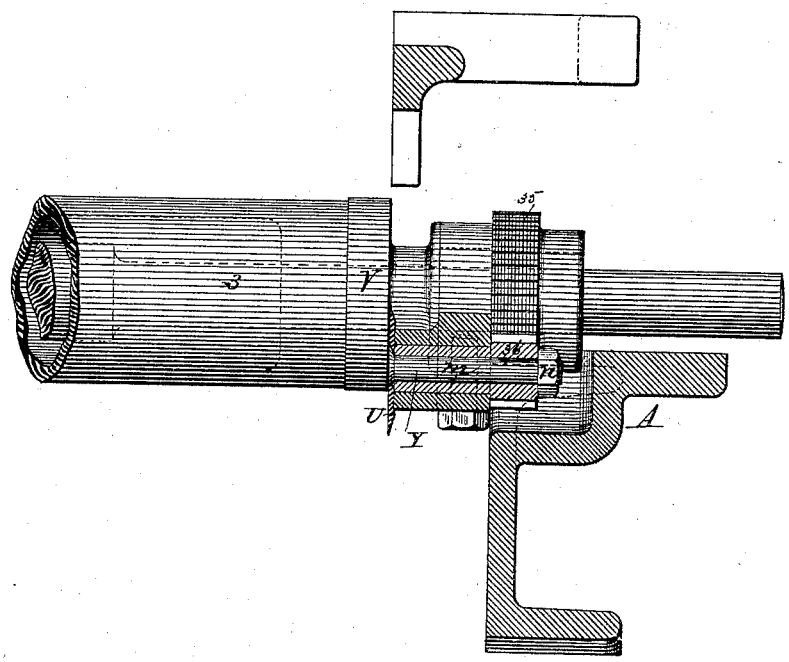
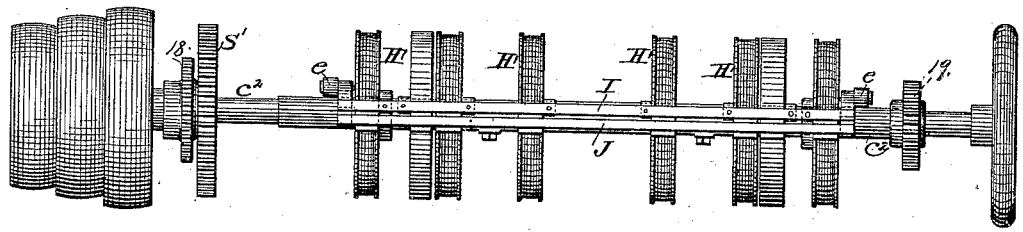

(No Model.) 15 Sheets—Sheet 11.
C. CHAMBERS, Jr., W. MENDHAM & T. C. DAMBORG.
MACHINE FOR FOLDING, PASTING, TRIMMING, AND COVERING SHEETS OF PAPER.
No. 445,498. Patented Jan. 27, 1891.
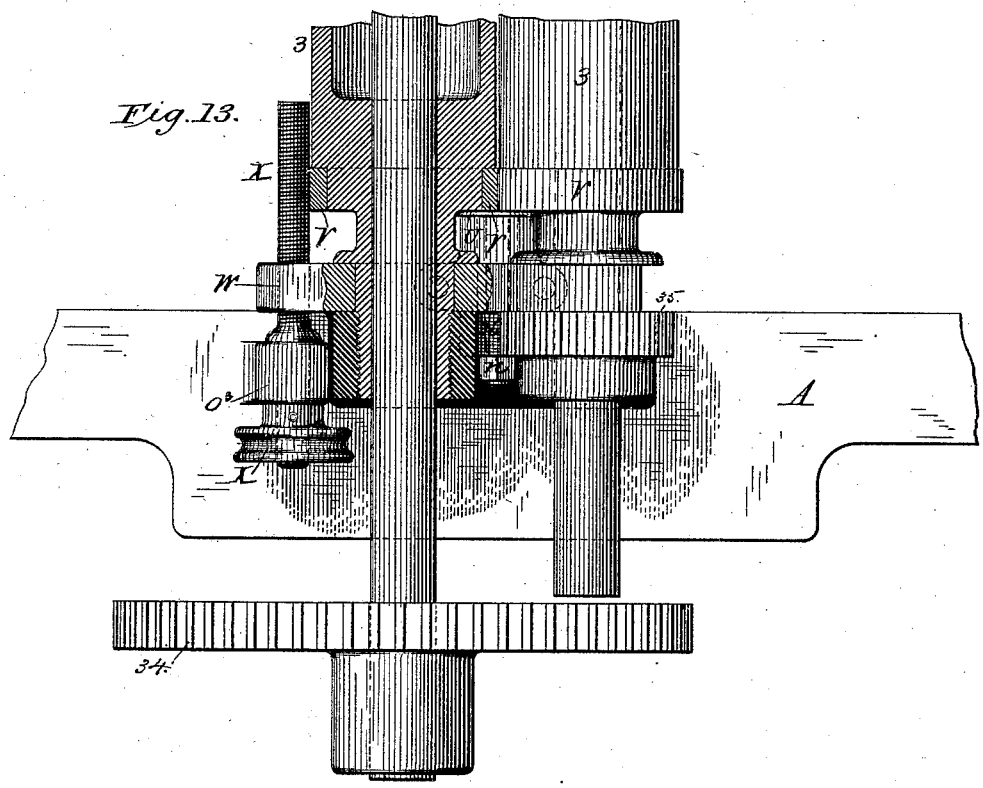
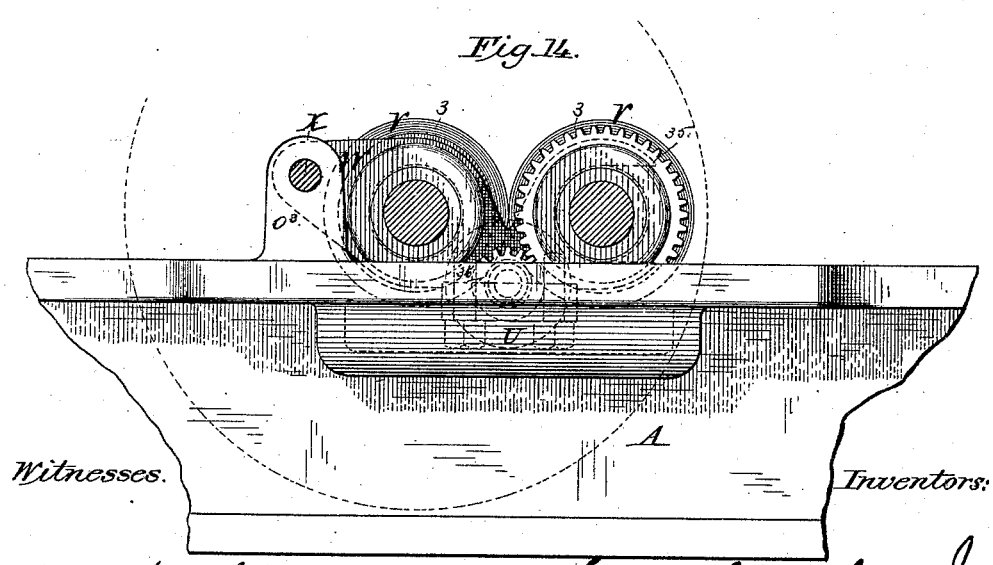

(No Model.) 15 Sheets—Sheet 12.
C. CHAMBERS, Jr., W. MENDHAM & T. C. DAMBORG.
MACHINE FOR FOLDING, PASTING, TRIMMING, AND COVERING SHEETS OF PAPER.
No. 445,498. Patented Jan. 27, 1891.
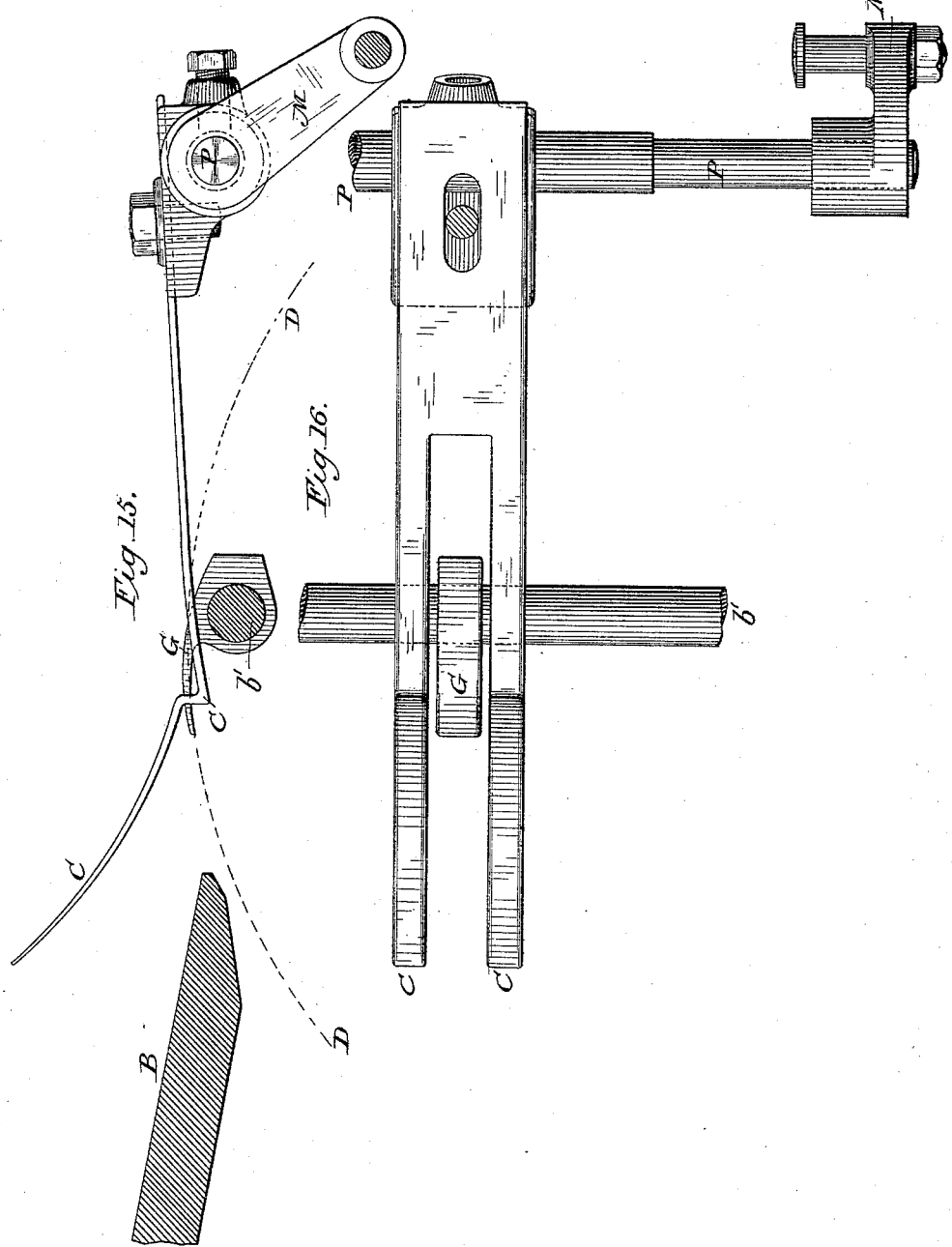

(No Model.) 15 Sheets—Sheet 13.
C. CHAMBERS, Jr., W. MENDHAM & T. C. DAMBORG.
MACHINE FOR FOLDING, PASTING, TRIMMING, AND COVERING SHEETS OF PAPER.
No. 445,498. Patented Jan. 27, 1891.
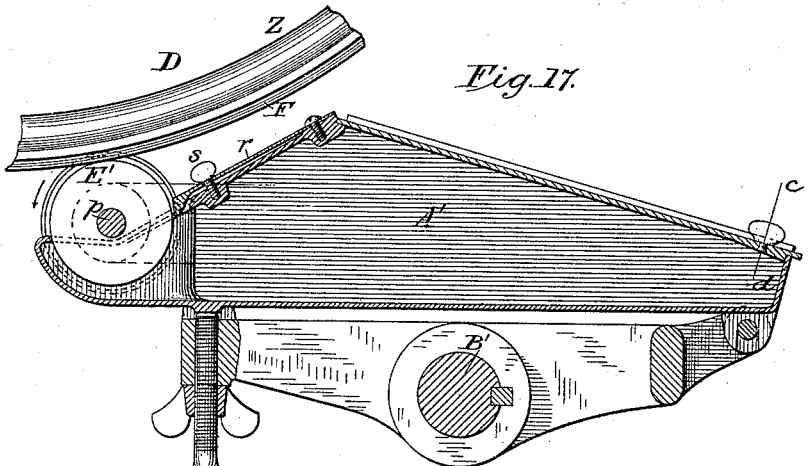
Fig. 17.
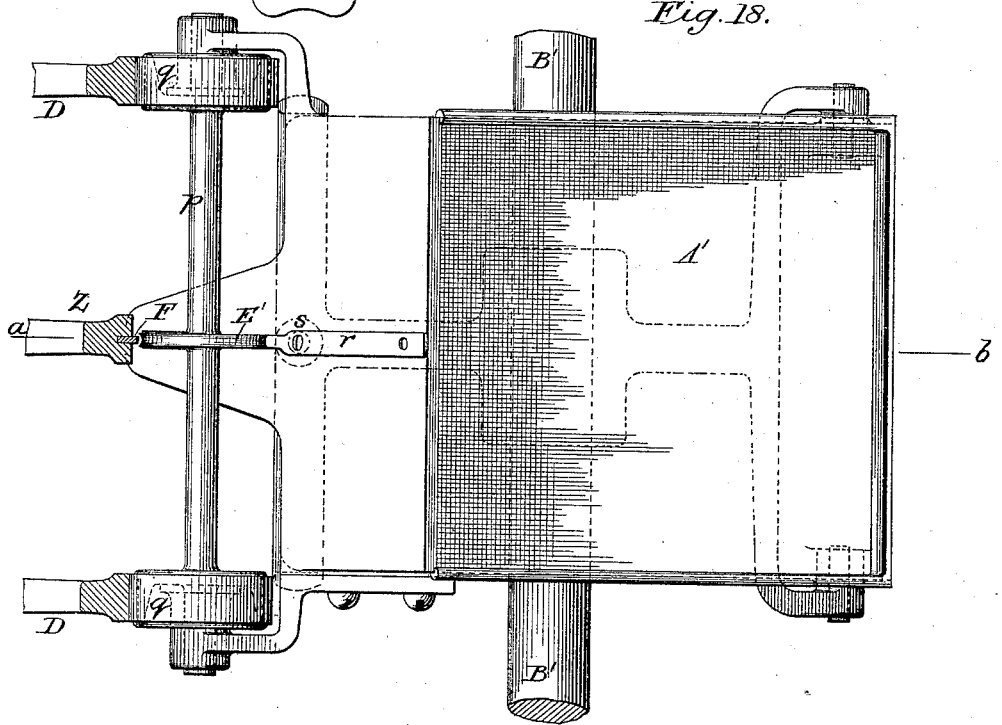
Fig. 18.
Fig. 19.
Witnesses. Inventors:

(No Model.) 15 Sheets—Sheet 14.
C. CHAMBERS, Jr., W. MENDHAM & T. C. DAMBORG.
MACHINE FOR FOLDING, PASTING, TRIMMING, AND COVERING SHEETS OF PAPER.
No. 445,498. Patented Jan. 27, 1891.
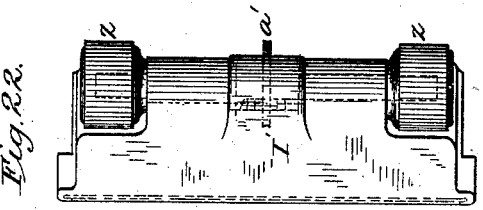
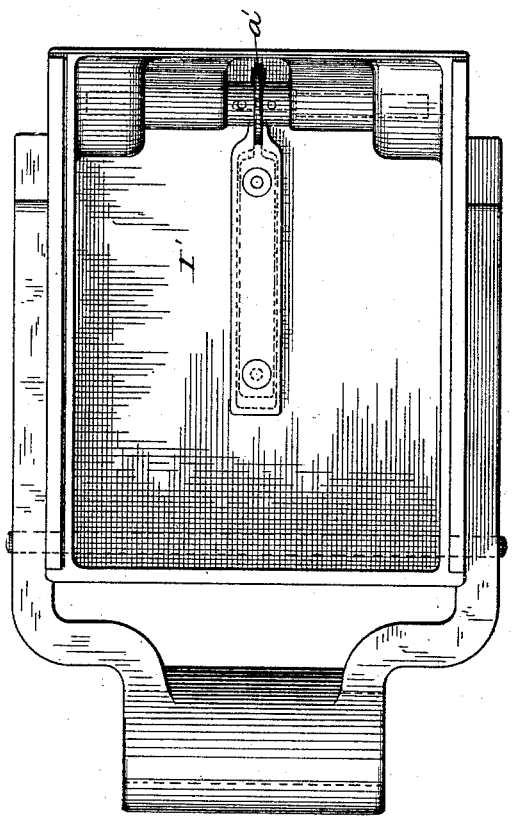
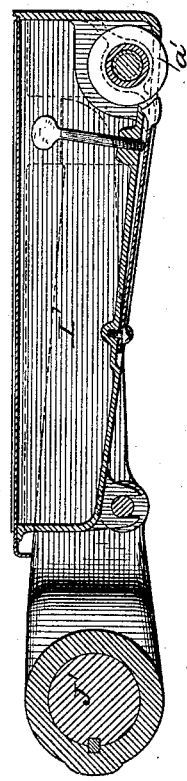

(No Model.) 15 Sheets—Sheet 15.
C. CHAMBERS, Jr., W. MENDHAM & T. C. DAMBORG.
MACHINE FOR FOLDING, PASTING, TRIMMING, AND COVERING SHEETS OF PAPER.

No. 445,498. Patented Jan. 27, 1891.

Witnesses.
John Burkhardt.
Wm. D. Carson.

Inventors:
Cyrus Chambers, Jr.
William Mendham,
Thorwald C. Damborg,
per Joshua Pusey atty.

UNITED STATES PATENT OFFICE.

CYRUS CHAMBERS, JR., WILLIAM MENDHAM, AND THORWALD C. DAMBORG, OF PHILADELPHIA, PENNSYLVANIA, ASSIGNORS TO SAID CHAMBERS.

MACHINE FOR FOLDING, PASTING, TRIMMING, AND COVERING SHEETS OF PAPER.

SPECIFICATION forming part of Letters Patent No. 445,498, dated January 27, 1891.

Application filed September 30, 1882. Serial No. 73,142. (No model.)

*To all whom it may concern:*

Be it known that we, CYRUS CHAMBERS, Jr., WILLIAM MENDHAM, and THORWALD C. DAMBORG, all citizens of the United States, and residents of the city and county of Philadelphia and State of Pennsylvania, have invented certain new and useful Improvements in Machines for Folding, Pasting, Trimming, and Covering Sheets of Paper, of which the following is a full, clear, and exact description, reference being had to the accompanying drawings.

Figure 2:
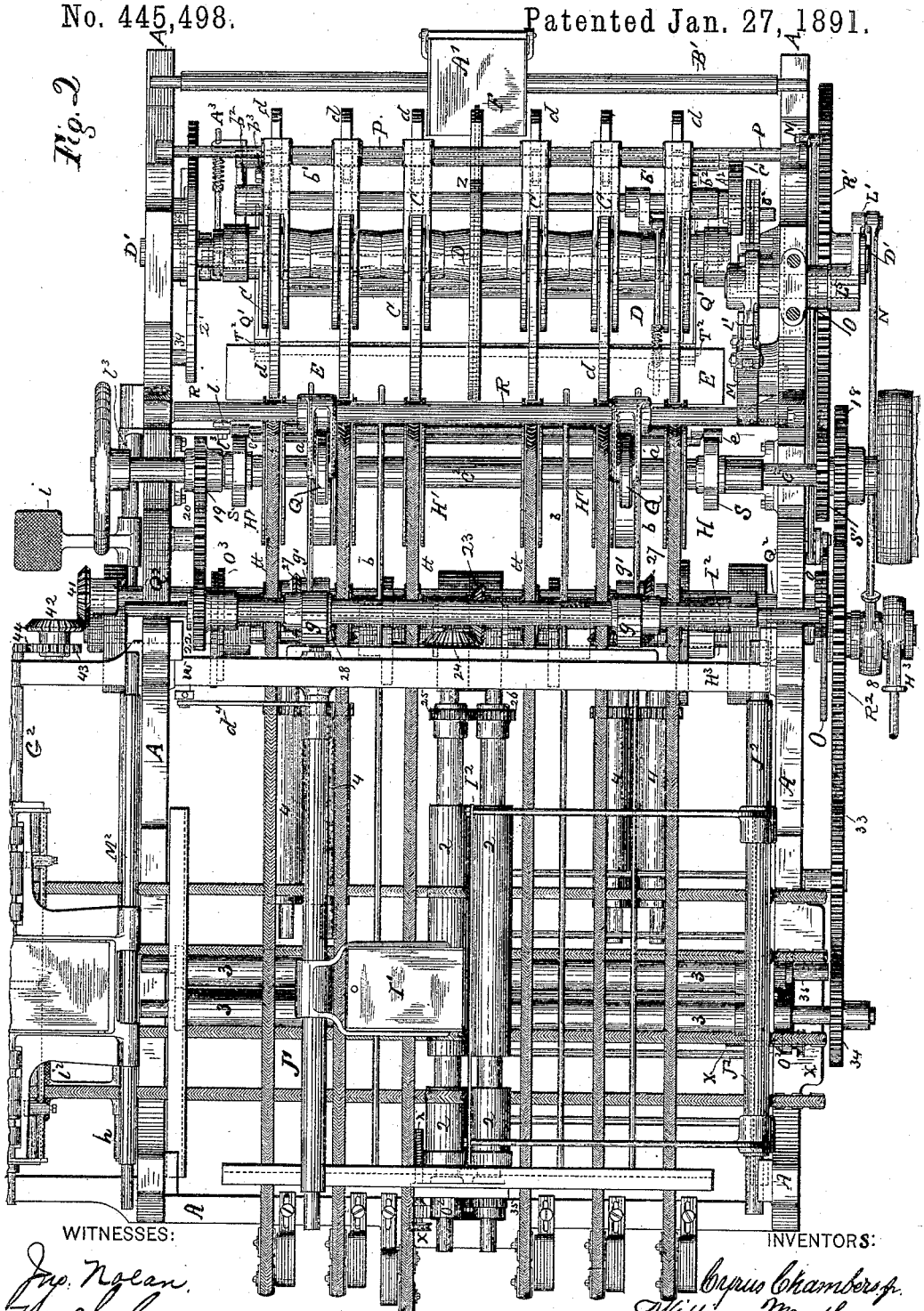
Figure 3:
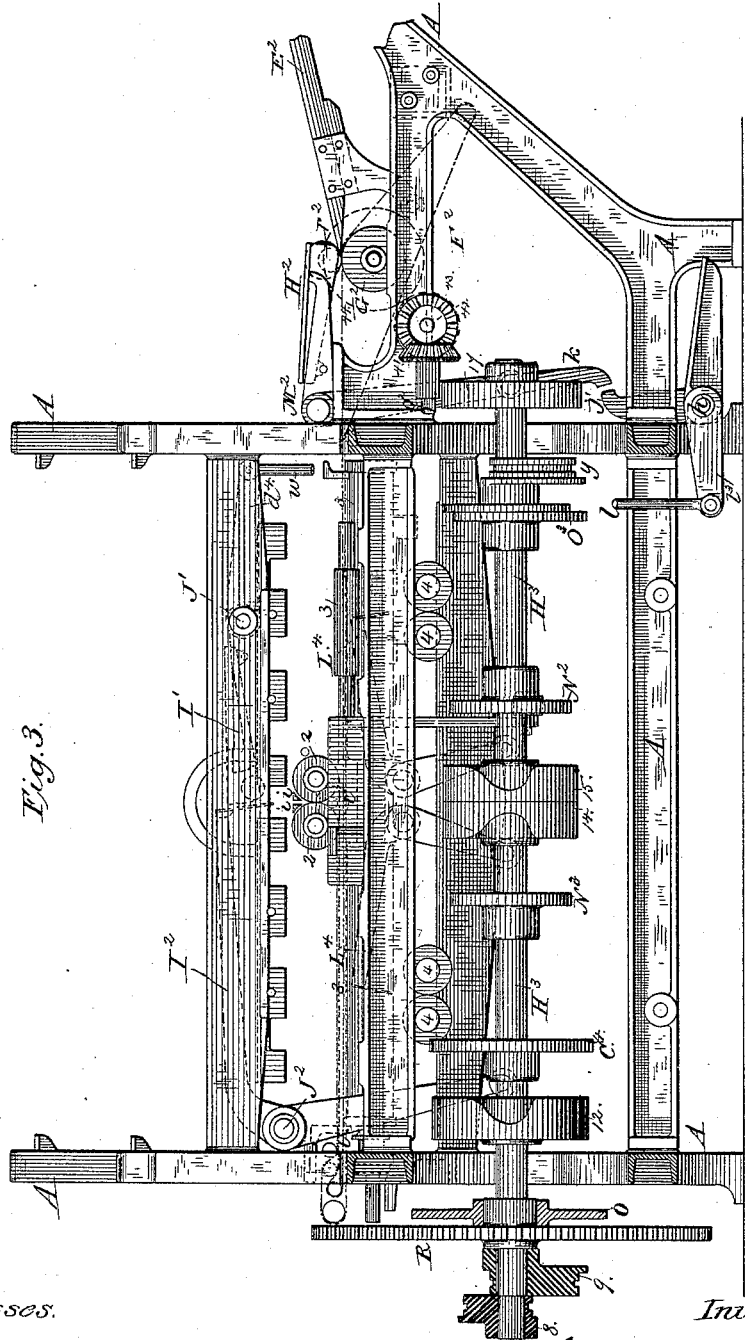
Figure 4:
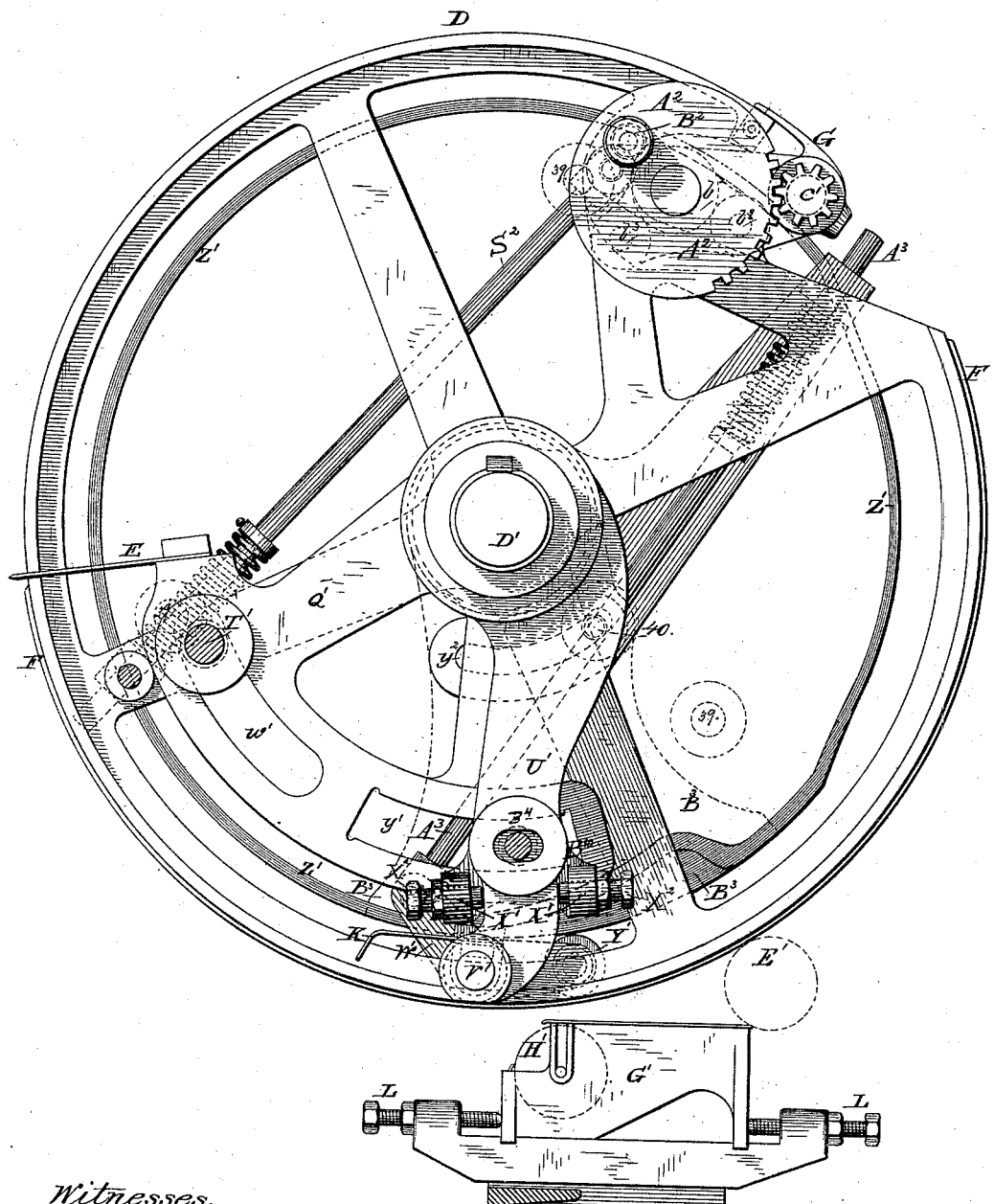
Figure 5:
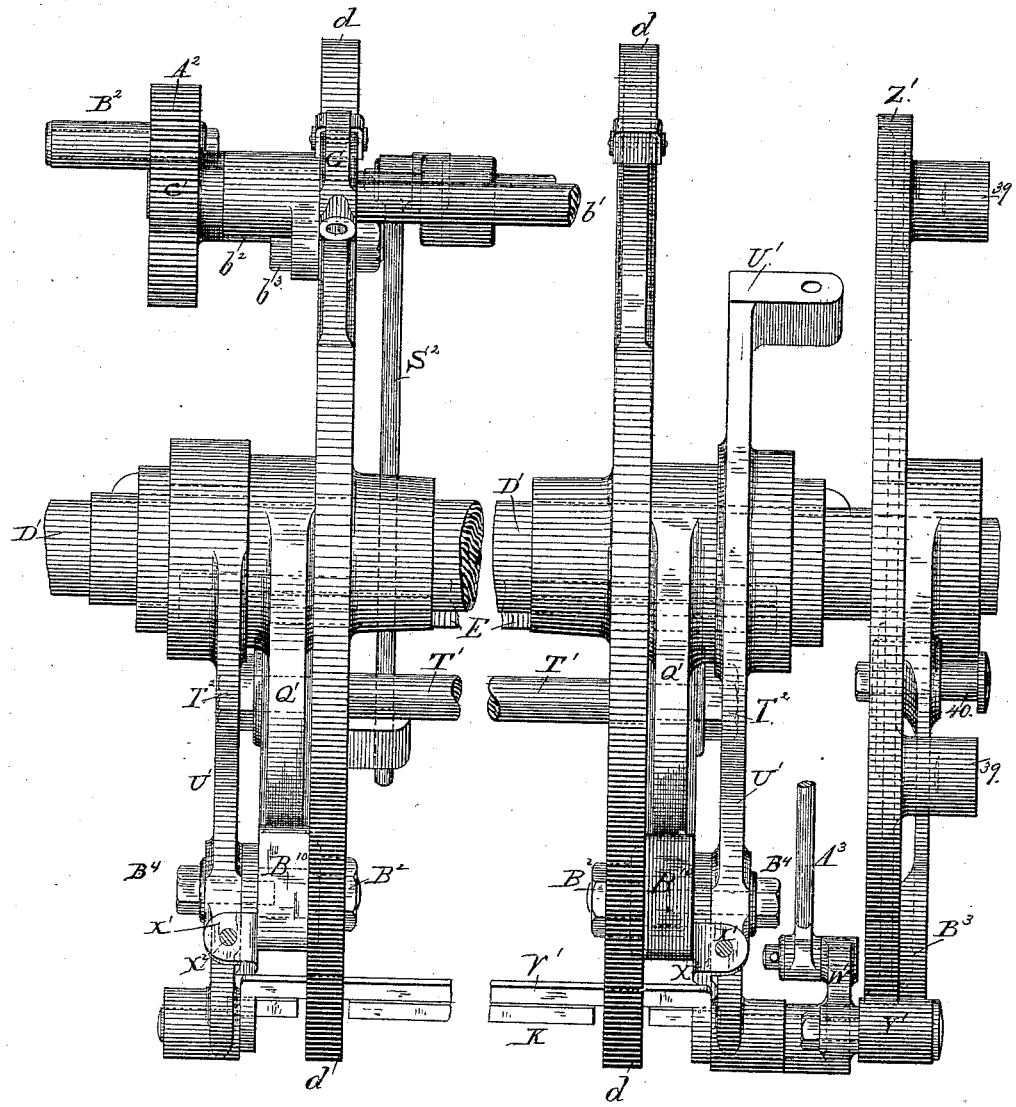
Figure 6:
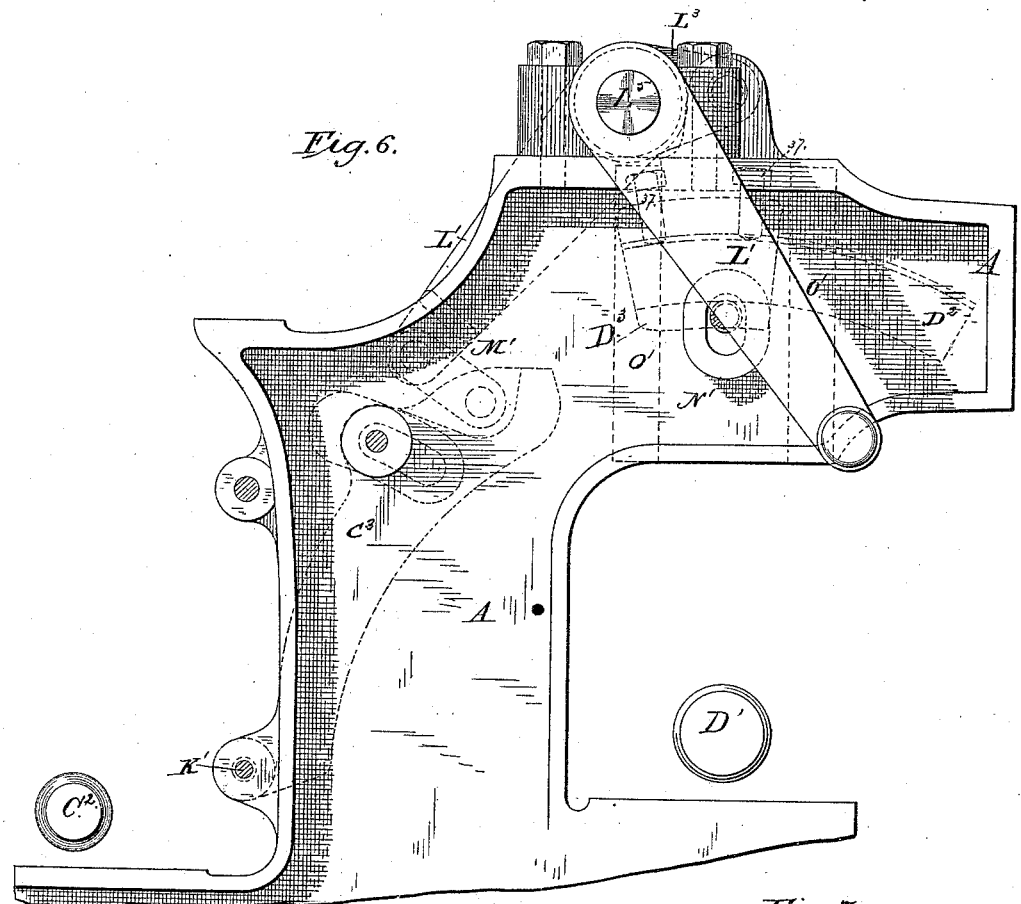
Figure 7:
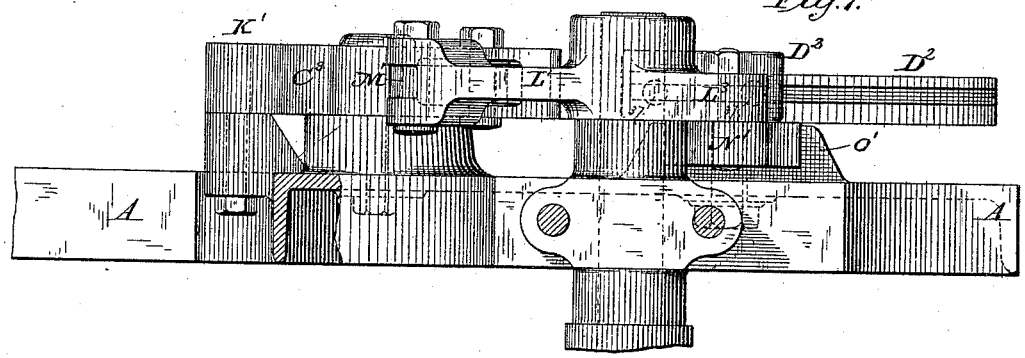
Figure 8:
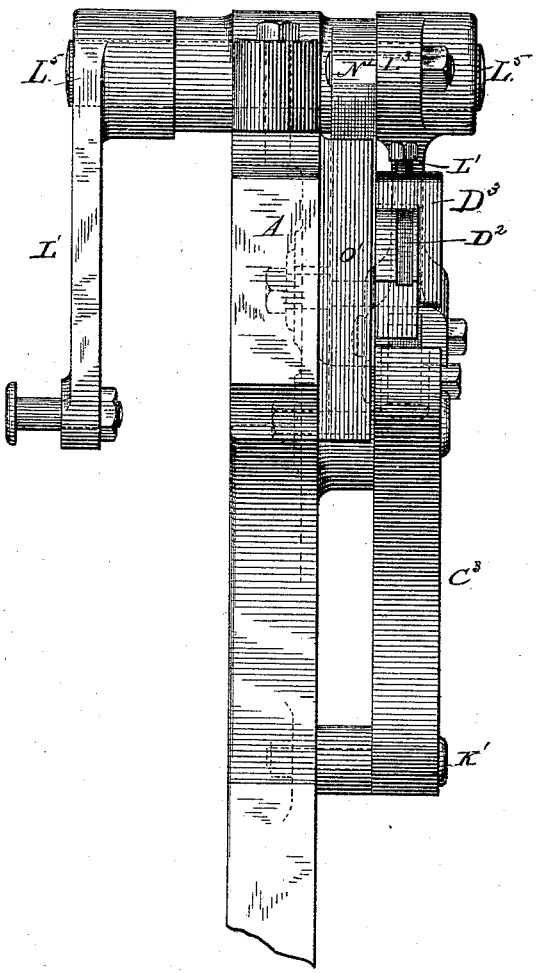
Figure 9:
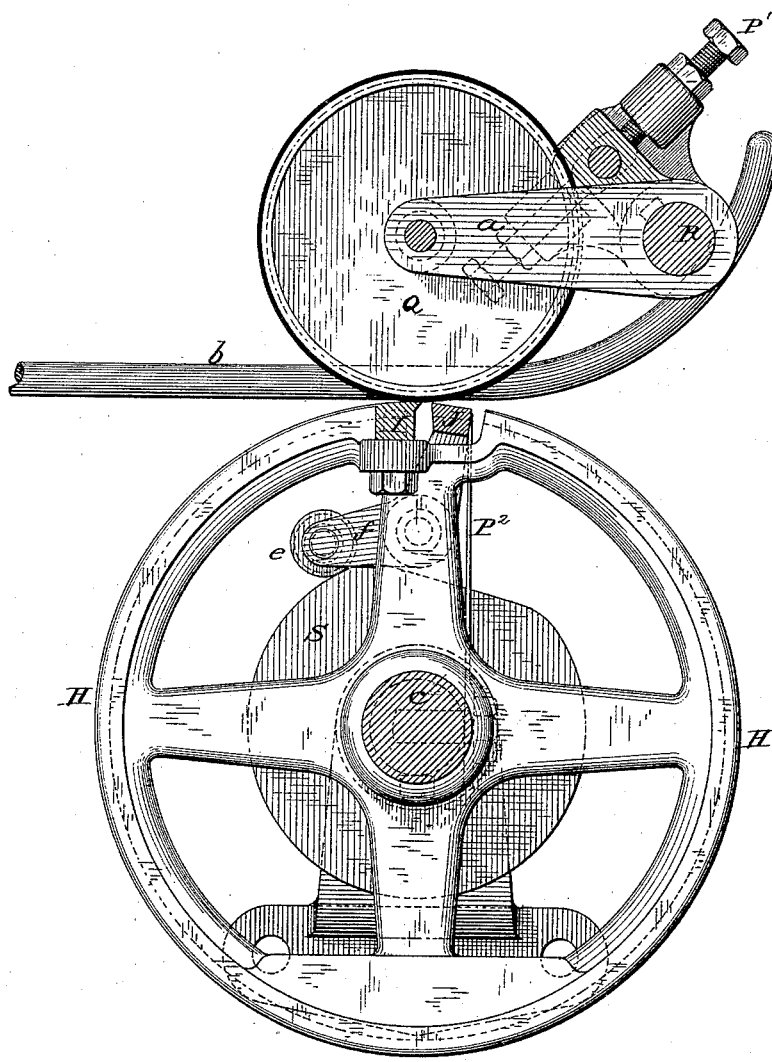
Figure 23:
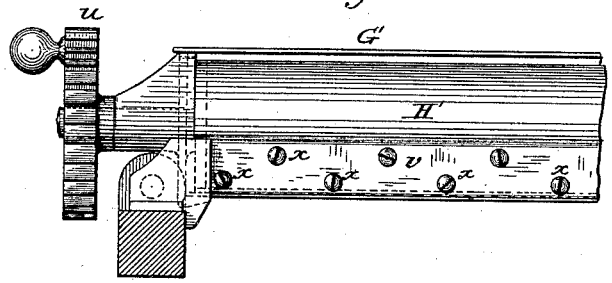
Figure 24:
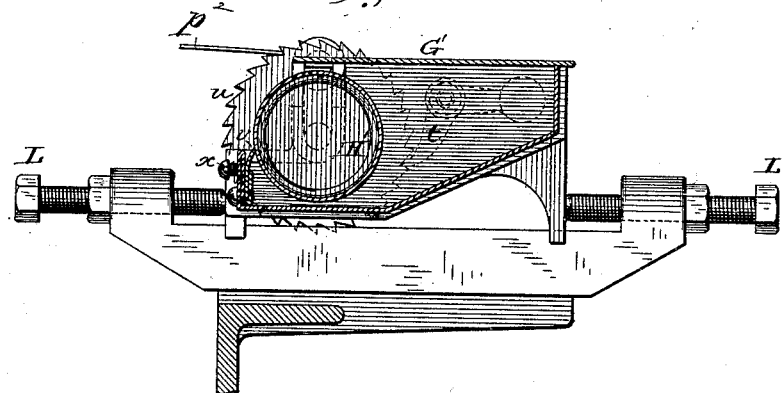
Figure 25:
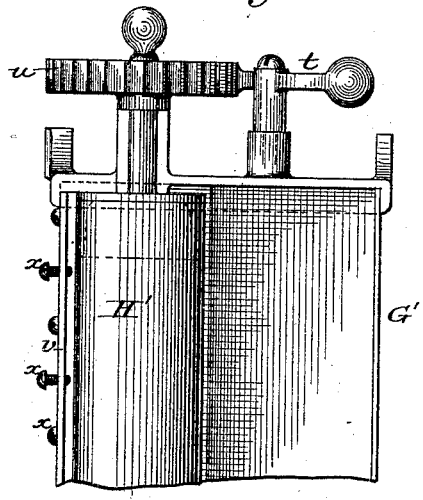

Figure 1 is a side elevation of the machine, looking from the side opposite the cover-feed; Fig. 2, a top view or general plan, feed-table removed; Fig. 3, a transverse vertical section on the line X of Fig. 1, looking toward the rear of the machine; Fig. 4, a side elevation of the main drum and paster; Fig. 5, details of the said drum. Figs. 6 and 7, Sheet 6, and Fig. 8, Sheet 7, are details of the sheet-gripping mechanism; Fig. 9, Sheet 8, a side elevation of the binder-roller, nipper-bars, and nipper-roller; Fig. 10, Sheet 9, and Fig. 11, Sheet 10, are details of the nipper mechanism of the nipper-roll; Fig. 12, Sheet 10, and Figs. 13 and 14, Sheet 11, are details of the trimming devices; Figs. 15 and 16, Sheet 12 are respectively side and top views of one of the grippers and gages. Figs. 17, 18, and 19, Sheet 13, are detail views of the first paste-fountain for an eight-page sheet. Figs. 20, 21, and 22, Sheet 14, are details of the last paste-fountain for a sixteen-page sheet. Figs. 23, 24, and 25, Sheet 15, are details of the first paste-fountain for a sixteen-page sheet.

The same letters of reference indicate the same parts wherever they occur in the drawings.

Our invention relates to the class of hand-fed folding machines for folding octavo and duodecimo sheets, and has for its object to combine in a single machine devices and mechanisms for the more perfect and rapid folding, pasting, trimming, covering, and packing either an eight-page or a sixteen-page sheet of paper, thus delivering a bound and covered pamphlet as rapidly as newspapers are ordinarily folded.

The machine in its general characteristics resembles the folding-machines commonly known as the "Chambers Folders." It has the usual arrangements of feed-table, folding-blades, and folding-rollers, with tapes and rods for conveying and guiding the paper from one pair of folding-rollers to another; mechanism for turning the sheet when required and for packing the folded sheets, and pasting, trimming, and covering mechanism.

We term this machine a "two-revolution" folder, as the folding and carrying device makes two revolutions for each sheet folded instead of one or three, as in the Chambers folders, heretofore in use.

The improvements consist in the details of construction and in the novel combinations hereinafter particularly described and claimed.

In the drawings, A marks the frame of the machine; B, the feed-table on which the bank of printed sheets to be folded, pasted, trimmed, and covered is supported.

The sheet-carrier D is made in the form of a skeleton drum on which the sheets are carried to receive the first fold. This drum is made of separate wheels or barrel-pulleys $d$, Fig. 2, on a common shaft D′, and is provided with grippers G to clamp the forward end of the sheet, mechanism for opening and closing them at the proper times, a folding-blade E for tucking the first fold-line of the sheet between the jaws I J of the nippers of the fold-roll H, a paste-blade F for applying paste to the first paste-line of an eight-page sheet, and mechanism for operating the paste-blade K, which applies paste to the first paste-line of a sixteen-page sheet. It will be observed that the line of paste applied by blade F is longitudinal with relation to the path of travel of the sheets through the machine, and that the line applied by blade K is transverse as to said line. The blades or pasters may therefore be distinguished by those terms.

The circumference of the drum D is equal to or greater than the length of the largest sheet the machine is designed to fold. It receives motion through gear S′ on the end of the main shaft $C^2$ and makes two revolutions to each sheet fed in, running idle one revolution to give time to feed down the next sheet. The point of application of the forward end of the sheet to the surface of drum D is regulated by an adjustable vibrating feed-gage C, attached to a rock-shaft P, which is operated by a crank-arm M, attached to a rod $o$, which connects with a cam O, Figs. 2 and 3. This gage is clearly represented in side and plan view in Figs. 15 and 16. It is forked, as shown, and straddles the gripper G, which works between the tines of the fork. In Fig. 15 the gage and the gripper are shown both down at the same time; but in practice this does not occur, as the gage must rise to allow the sheet to pass it at the instant the grippers close down to clamp the forward edge of the sheet to the drum. The gage serves not only as a stop for the end of the sheet, but also as a temporary clamp to hold the edge of the sheet down upon the wheels $d$ until it is grasped by the grippers.

H' is a folding-roller running a multiple of the revolutions of the drum D, preferably two to one, and is provided with creasing-nippers I J, (see Fig. 11,) into which the first fold-line of the sheet is introduced by the creasing-blade E, Fig. 4, of the drum. This wheel H is made of a series of pulleys on a common shaft $C^2$, Fig. 2, and is provided with tapes, which pass over the pulleys marked H' of the nipper-roll, and which carry the once-folded sheet under the rods $b$ and over the second pair of folding-rollers 2 2. Binder-wheels Q, which turn in arms $a\,a$ of a rod R, bear upon the upper side of the sheet and clamp it to the surface of plain wheels on shaft $C^2$, Figs. 2 and 9. The nippers I J are opened and shut at the proper times by the action of a spring $P^2$ and cams, Figs. 2 and 9, on the adjacent frame upon the rollers $e$, each of which is secured to a stud projecting from the arm $f$, attached to the movable jaw J of the nippers. The binder-rollers Q are tired with rubber and are given any desired pressure upon the sheet by the upper of two opposed adjusting set-screws P'.

The lower set-screws P' (shown by broken lines in Fig. 9) are adjusted so as to prevent the roller from interfering with the operation of the nipper-jaws I J. As the sheet is carried on tapes under the rod $b$, it passes between the tail-grippers $g\,g'$, which are constructed and operate similarly to those described in Chambers and Mendham's patent, No. 225,506, of March 16, 1880, lines 35 to 65, page 2, except that in the present machine the tail grippers or "catchers" are geared to make four revolutions to each sheet fed in and retard the motion of the sheet to one-half the speed at which it is carried on the drum.

When the once-folded sheet lies over the second pair of folding-rollers 2 2 its center is supported upon two triangular bars $i\,i$, Fig. 3, forming a narrow opening to the bite of the folding-rollers, whereby the sheet is withheld from being gripped by the rolls before the crease is forced into the bite by the blade $I^2$, Fig. 2. By this means the outer or under ply of the once-folded sheet is prevented from being drawn off or separated from the inner or upper ply before the blade can tuck it into the bite of the rolls, thus securing the proper contact of the paper for the adhesion of the paste, also insuring the passage of the sheet through the second folding-rollers squarely, so that the folded edge or head, when trimmed, will be at right angles to the second folded edge of an eight-page sheet. This device for another purpose is described in Letters Patent No. 216,600, granted to Cyrus Chambers, Jr., June 17, 1879. The rollers 2 2 are run through the gears 25 and 26, and bevel-gears 23 and 24, Fig. 2. Gear 23 is upon the shaft of the lower tail-grippers $g'$ in frame A, to which shaft rotation is imparted from the main shaft $C^2$ through gears 19, 20, and 21. A double set of folding-rolls 3 3 is introduced, (see Figs. 1, 2, and 3,) so that the sheet may run either to the right or to the left of the second folding-rollers, as preferred, and the third fold be made either way, and the title be brought into the required position. Rolls 3 3 are driven from the main shaft $C^2$ through gears $R^2$, 33 and 34. When a fourth fold is required, we add a fourth pair of folding-rollers 4 4 on each side of the second folding-rolls 3 3, as clearly shown in Figs. 2 and 3. The fourth fold on a sixteen-page sheet should preferably turn the title inward, so as to protect the title-page in the mails. These rolls 4 4 are driven from the shaft $Q^2$ by the bevel-gears 27 and 28. The completely-folded sheet falls into a packing-box T of ordinary construction, (preferably that described and shown in Letters Patent No. 141,491, dated August 5, 1873,) and is packed and delivered in the ordinary way.

In combination with this machine we add in a supplemental frame at the side (see Figs. 2 and 3) a covering attachment, whereby an independent sheet of paper of proper size to form a cover for the principal sheet may be fed to the machine and folded and pasted onto the outside of the sheet previously folded and pasted by the machine. This attachment is of substantially the same construction as that described in Letters Patent of Cyrus Chambers, Jr., No. 164,904, dated June 29, 1875.

A tripping device differing somewhat but in general respects similar to that used in other Chambers folders is used to enable the feeder of the main sheet or the feeder of the cover to arrest the gripping device of the other whenever he is not ready to feed in, so that a sheet may at no time be fed without its accompanying cover, or a cover without the main sheet. When the feeder is not prepared to feed in the main sheet, he presses his foot down upon the treadle $i$, Figs. 1 and 3, on shaft $h$, whereupon a lever $j'$ upon the latter is caused to press against the side of the arm of a lever $k$, attached to the shaft $M^2$, which carries the paste-fountain with its drop-roller $r^2$. This movement prevents the latter from dropping, whereby the cover-feeder is unable to feed in until the main feeder releases his hold upon the treadle $i$. Should, on the other hand, the cover-feeder not be ready to feed the cover, he presses his foot upon the treadle $i^2$ on shaft $h$, Fig. 1, which shaft carries an arm $l^3$, to which is pivoted a vertical rod $l$, whose upper end lies close to or in contact with the under side of the forward end of the feed-table B, resting upon the frame A of the machine, whereby the pressure upon the treadle causes the raising of that end of the table upon which the sheets are banked, thereby carrying the sheet out of reach of the gripper G on drum D. Upon removal of the pressure upon the treadle the gravity of the table brings it again into position for feeding the sheet. This raising of the feed-table for the purpose stated we believe to be new.

An eight-page sheet, in order to open as a book, requires to be cut open or trimmed at the first folded edge, and a sixteen-page sheet at the first two folded edges. To accomplish such cuttings we have arranged a cutter at the end of the second pair of rollers 2 2, Figs. 2 and 3, and one at the end of the third folding-rollers 3 3, Figs. 1 and 2, of the sixteen-page sheet. The details of this cutting or trimming device are clearly shown in Figs. 12, 13, and 14. It consists of a thin circular blade of steel U, run at high velocity, placed at the end of the second and third pairs of rollers, and having its cutting-edge about opposite to the contact or biting part of the rollers, so as to pare off any portion of the folded edge of the sheet which may project beyond the end of the rollers. This is clearly shown in the figures referred to, in which U marks the cutters and V the steel ends or collars in contact on the rollers, so as to bind the paper and for the cutters to shear against. The adjustment of the rollers (or sliding sections thereof) on their shafts and of the cutters with the gearing 35 and 36 operating them is clearly shown in Figs. 12, 13, and 14. The brass box W engages circumferential recesses in the hubs of the rollers and carries the cutter U, and at the same time adjusts the rollers endwise to suit the different sizes of sheets to be trimmed. Box W is adjusted by the screw X, which is secured in the lug $O^3$ of frame A. The cutter may be taken out to be mended or sharpened by removing the nut $n$ on its central stud Y, when the latter can be pushed through its hollow journal $m$ and the cutter and thus release it.

The pasting devices in this machine vary in character, location, and operation with the work they have to perform. The first paste-blade F projects from the rim of a disk Z, placed in the middle of the drum-shaft $D'$. (See Figs. 2, 4, 17, and 18.) This blade is a narrow strip of brass let into a groove in the periphery of the pulley or disk Z and extends a sufficient distance around the same to apply a line of paste equal in length to half the length of the longest eight-page sheet which the machine is designed to paste and fold. This paste-blade is only brought into use when eight-page sheets are being folded. It receives paste at the proper times from a paste-fountain $A'$, located in front of the drum D, as shown in Figs. 1, 17, 18, and 19, and resting in a suitable frame attached to a rock-shaft $B'$, oscillated by levers 5 7 and link 6, which receive motion from a cam $C^4$, Fig. 3, on the main cam-shaft $H^3$. (See Figs. 1 and 3.) The construction of this fountain is fully shown in the figures, sections, and plan on sheet 13. The paste-box $A'$ has its paste-wheel $E'$ on the middle of a shaft $p$, and on the same shaft are two rubber-banded wheels $q$, which run in contact with the perimeters of two of the disks or pulleys of the drum D. The rotation of the drum, the wheels $q$ being in contact with it, imparts motion to the wheels and to the paste-wheel $E'$, which at the same time runs in contact with the edge of the paste-blade F. When the paste has been applied to the whole of the edge of the blade F or to so much of it as the work in hand shall require, the cam $C^4$ causes the shaft $B'$ to rock to a position which throws the paste-wheel out of contact with blade F. The said cam is adjustable to give any required throw to the rock-shaft, so as to begin and end the application of the paste at any desired points on blade F. When not wanted for use, the fountain can be lifted out of its frame. On the top part of the fountain is a slicker-spring $r$, which by being raised or lowered by means of a thumb-screw $s$ regulates the quantity of paste the wheel is allowed to carry.

The groove by which the paste-wheel enters the fountain is wider on the return side, so as to allow the paste which has not been delivered to re-enter the fountain, and thereby prevent the accumulation of paste on the machine, which would be fatal to its successful working.

The first paste-line of a sixteen-page sheet is given by a paste-blade K, attached to, revolving with, and operated by the drum, as hereinafter described. This blade is supplied with paste by the fountain $G'$. (Shown in Figs. 23, 24, and 25, Sheet 15, in front elevation, transverse section, and plan view, respectively. See also Figs. 1 and 4.) A tubular roller $H'$, of brass, is rotated by means of a pawl $p^2$ and ratchet $u$ in a paste-box and presents a new surface to the blade K, Figs. 1 and 4, at every other revolution of the drum. A slicker $v$ in front is adjusted by a number of small screws $x$, such adjustment determining the amount of paste the roller is permitted to carry. The paste-roller is brought into proper relation with the paste-blade K by means of the opposed adjusting-screws L, Figs. 4 and 24. The second paste-line of a sixteen-page sheet is given by the fountain I'. (Represented in plan, front elevation, and section in Figs. 20, 21, and 22, respectively. See also Figs. 2 and 3.) This fountain is located on the rock-shaft J', Fig. 3, and gives the paste-line direct from the wheel $a'$ to the sheet when it is passing between the second pair of rollers 2 2. The paste-wheel $a'$ is caused to rotate by the rollers when the paste-fountain is lowered by lever $d^4$, rod $w$, lever $d'$, Fig. 1, and cam $O^3$ on the shaft $H^3$, Figs. 1 and 3, so as to rest on the rolls and compel the rubber-banded wheels $z$, Fig. 22, on the paste-wheel shaft to turn. Adjustments similar to those used in the fountain A', previously described, are applied to this.

The covering attachment has a paste-fountain similar to that last referred to I', which applies paste to the middle line of the cover as it is fed in from the table $E^2$ onto tapes which carry it under the sheet about to receive its third fold. Upon the descent of the third folding-blade the sheet and cover are folded and pasted together, making a pasted and covered pamphlet of sixteen pages, with a cover of four pages, in the manner described in the Letters Patent of Cyrus Chambers, Jr., No. 164,904. The roller $G^2$, over which the cover passes, is driven from the shaft $Q^2$, Fig. 2, by bevel-gears 41 and 42 and gears 43 and 44.

All the parts and movements of the machine are arranged and co-ordinated with reference to the main drum or carrier D, which grips, carries, and pastes the sheet and delivers it to the folding mechanism for further operation. The construction of this drum and its relation to the other parts of the machine are clearly exhibited in the drawings, especially in Figs. 1, 2, 4, and 5. It carries the feeding-grippers G, which are arranged, substantially as in an ordinary drum printing-press, on a gripper-bar $b'$, mounted in bearings $b^2$, secured by bolts $b^3$ to wheels $d$. On the end of bar $b'$ is a pinion $c'$, meshing into a wheel $A^2$, carrying the roller-stud $B^2$, which stud is actuated so as to close the grippers by the oscillating cam $C^3$, and so as to open them by the reciprocating cam $D^3$, as shown in Figs. 6, 7, and 8. A spring-pressed rod $S^2$, pivoted at one end to wheel $A^2$, holds it in either position to which the cams carry it. The cam $C^3$ oscillates about the stud K', carrying the same, and is actuated by the bell-crank L' and connecting-rod M. (Clearly shown in Fig. 6.) Crank L' is connected by a rod N with an eccentric 8 on the end of shaft $H^3$, Fig. 3. This cam $C^3$ effects the closing of the nippers, which must take place when they approach the end of the sheet to be grasped. This is always at one fixed point in the revolution of the drum D, and hence this cam requires no adjustment around the drum or in the direction of its motion. The cam $D^3$, on the contrary, which opens the grippers, must be made adjustable around an arc $D^2$ of the drum for the purpose of accommodation to the various lengths of the sheets, and such adjustability must be equal to half the difference in the lengths of the sheets the machine is designed to fold. As this opening-cam $D^3$ must not open the grippers until the drum has made a little more than a revolution after gripping a sheet, it is attached to a sliding piece N', which moves up and down and brings it into action at the proper point, as clearly shown in Figs. 6, 7, and 8. This sliding piece is segmental, as shown, and around it the adjustable cam $D^3$ is moved and may be set according to the length of the sheet to be folded and secured by screw-bolts 37. Long sheets require to be carried farther than short ones. This piece N' moves vertically between lugs O' on the inside of the frame A, and is actuated by the short or third arm $L^3$ of the bell-crank L', before mentioned. It results from this that when the cam $C^3$ is in a position to close the grippers the cam $D^3$ is out of the path of the tumbler-stud $B^2$ on the gripper-wheel $A^2$ and allows the grippers to pass unopened. When, on the contrary, the cam $C^3$ is oscillated out of the path of the stud $B^2$, the cam $D^3$ is brought into its path and actuates the stud to open the grippers at whatever point in the circle the cam $D^3$ may be set.

The creasing-blade E in the drum D, Figs. 4 and 5, is secured permanently to the blade-arms Q', which in their turn are secured permanently to the drum-shaft D', which also carries the gear R', which engages with and is driven by the gear S' on the shaft of the nipper or folding-roller H. (See Figs. 2, 9, 10, and 11.)

The drum D is not keyed upon its shaft D', but is loose, and may be adjusted around it in any desired position and there held by the bar T' through the different sections of the drum and the slotted arc $w'$ of the permanently-keyed blade-arm Q', Figs. 4 and 5. It is secured to this arm by a nut $T^2$ at either end of said bar T'. The object of this is to adjust the position of the grippers G, which carry the sheet in proper relation to the creasing-blade E, so that sheets of various lengths may be folded in the same machine, and yet the grippers be permanently fixed in the drum and the creasing-blade E never be thrown out of its adjustment with the folding-roller H. Loose upon and around the hub of the blade-arms Q' swing two arms U' with a swinging or vibrating paste-blade K, (see Figs. 4 and 5,) and which are held in place by means of a tap-bolt $B^4$ and nuts $B^2$ of a box $B^{10}$, working in a segmental slot $y'$ of the arm Q'. These paste-blade arms are also adjustable around the arc of the drum D, so that the paste-blade K may be set any desired distance from the creasing-blade E, so as to correctly paste the various sizes of sixteen-page sheets the machine is designed to work. Very accurate adjustments of the position of this paste-blade K may be effected by means of the set-screws $x^2$ in the lugs $x'$ of the box B'. (See Figs. 4 and 5.)

On one end of the paste-blade bar V' is a bell-crank W', one end of which carries a compression-spring bar $A^3$, which tends to force the paste-blade K out from the interior of the drum, and the other end a cam-roller Y' for controlling by the arc of a cam Z', Figs. 2, 4, and 5, the movements of the said paste-blade. The cam Z', which is stationary, has on it studs 39, by which it is bolted to the inside of the frame A of the machine, and is of such shape that it allows the spring of bar $A^3$ to force the blade K out to the periphery of the drum, so as to come in contact with the under side of the paper when projected its least distance while the paper is around the drum, and also at another point of the revolution of the drum to project far enough to come in contact with the paste-fountain roller H', already described, located wholly outside of the drum D, as clearly shown in Fig. 4. This paste-fountain and roller are shown in detail in Figs. 23, 24, and 25.

As the paste-blade K must not project to receive paste during that revolution of the drum which carries in the sheet, but may at every revolution project as far as the paper on the drum, that part of the cam Z' which allows it to extend far enough to apply paste to the paper is never closed, but the blade allowed to project this short distance during every revolution. That part of cam Z' which permits the blade to project far enough to take the paste from fountain G' is closed during every other or idle revolution of the drum by an oscillating segment or swinging cam $B^3$, Fig. 5. (Shown also in dotted lines in Fig. 4.) This cam is hung loosely on shaft D' on the outer side of cam Z'. Into a curved slot $y^2$ in cam Z' extends one end of a pin 40 on cam $B^3$, and the outer end of said pin is connected to an eccentric $y$, Fig. 3, on the cam-shaft $H^3$, which makes one revolution to each sheet folded or one to every two of the main drum D. Cam Z' is open for the projection of the paste-blade K to receive paste from fountain G' during every idle revolution of the drum.

It will be understood that paste is applied by the devices described when a sixteen-page sheet is to be folded by the machine. When an eight-page sheet is to be folded and pasted, the fountain G' is removed and the other A' is supplied, which, as described, has an oscillating motion, so that the wheel when raised applies paste to the blade F in the center of the drum.

The operation of the machine is as follows: The sheets to be folded are placed on the table B and fed in by hand to the main drum D. The covers are placed on the table $E^2$ of the covering device, Fig. 3, and are also fed in by hand, being carried in between the roller $G^2$ and the drop-roller $r^2$, Fig. 3, on the paste-fountain. The folded sheet and its cover arrive at about the same time on independent tapes over the pair of rollers 3 3 for giving the third fold and pass between those rollers and folded together by them and drop into the packing-box T, or are again folded by the rollers 4 4. The forward end of the sheet on reaching the drum D comes into contact with the gages C and is held under the gage-fingers until the grippers take it, when the gage rises and the sheet is carried around on the drum till its first fold-line midway of the length of the sheet comes opposite the nippers I J of the wheel H, and is tucked into the bite of those nippers by the creaser-blade E, all as previously described. The sheet thus clasped by the nippers is then carried by wheel H beneath the binder-pulleys Q, thence by suitable tapes under rods $b$ between the tail-grippers $g$ $g'$ on the bars $i$ $i$ over the rolls 2 2. The blade $I^2$, descending by the action of the cam 12 on shaft $H^3$, tucks the once-folded sheet in between the rolls 2 2, the paste-line being made by the roller $a'$ of fountain $I^2$, operated by cam $O^3$. At the same time it is trimmed by the blade U. It then passes on tapes to the rollers 3 3, between which it is tucked by the blade $I^3$, actuated by cams $N^2$ or $N^3$ on shaft $H^3$. The cover, which is fed in by the other feeder, receives its line of paste from the fountain $H^2$, passes on tapes until it is brought into position beneath the sheet, and is folded in with the latter by the rollers 3 3. The covered and folded sheet falls into the packing-trough beneath; or, if an additional fold is desired, it is caused to pass on tapes to the rolls 4 4, between which it is tucked by the blade $L^4$, actuated by cam 14 or 15 on shaft $H^3$. If the sheet be one of sixteen pages, it receives its first paste-line from the projected blade K, which has been supplied with paste by contact with the roller of the fountain G' during the idle revolution of the drum, as before described. The second line of paste is applied to the sixteen-page sheet by the wheel of fountain I', as described. It will be seen that the sheet upon receiving its second fold by rollers 2 2 may readily be carried onto rollers 3 3, either to the right or to the left, (as the tapes may be arranged,) and folded in either direction, as desired.

In describing the adjustment of the rollers which are provided with trimmers we have stated that the rollers were adjusted with the trimming blades and gears to suit the different sizes of sheets. We prefer to make sections only of these rollers thus adjustable, as in Figs. 12, 13, and 14. In Fig. 2, it will be observed, the rolls 2 2 are thus made with sections and the rolls 3 3 are adjusted their entire length.

We make no claim in this application to the combination, with the main drum provided with the paste-blade in the arc of a circle concentric with the drum, of the paste-fountain provided with the roller.

We claim as new and wish to secure by Letters Patent—

1. The combination, in a single machine, of a sheet-carrier provided with a transverse and a longitudinal paster interchangeably operative, with folders and trimmers, substantially as described, whereby either eight-page or sixteen-page sheets may be pasted, folded, and trimmed, each by automatic and continuous operations, all substantially as set forth.

2. The combination, in a single machine, of a sheet-carrier provided with a transverse and a longitudinal paster interchangeably operative, with folders and trimmers and a cover feeding and pasting mechanism, substantially as described, whereby eight-page sheets may be pasted, folded, and trimmed and sixteen-page sheets may be pasted, folded, trimmed, and covered, each by automatic and continuous operations, all substantially as set forth.

3. The drum D, loose upon its shaft and provided with grippers, in combination with the creasing-blade E and its fixed arms Q', provided with the slots $w'$ and bar T', with clamping-nuts, all constructed and operating substantially in the manner and for the purposes set forth.

4. The combination of the grippers G on drum D, gripper-shaft $b'$, pinion $c'$, wheel $A^2$, tumbler-stud $B^2$, oscillating cam $C^3$, and reciprocating cam $D^3$, all constructed and operating substantially as and for the purposes set forth.

5. The mechanism making a first fold in sheet, and the bars $i\,i$, combined and arranged as shown with relation to the bite of the folding-rollers and their creasing-blades making the second fold in said sheet, whereby the folded sheet is withheld from being gripped by said rollers before the crease is forced into their bite by said blades and the under ply of the folded sheet is prevented from being drawn off from the upper ply before the blade can tuck it into the bite of the rolls, substantially as described.

6. The combination of the drum D, having the arms Q', carrying creaser-blade E, the nipper-roll H, binder-rolls Q, curved bar $b$, and a conveying mechanism, substantially as described, for carrying the once-folded sheet under the said bar and away from roll H, substantially as set forth.

7. The combination, with the main carrier-drum, of the circular paste-blade on its periphery and a vibrating paste-fountain applying paste to said blade at every other or idle revolution of the drum, whereby the paste-line is made upon the inside surface of the sheet, substantially as shown and described.

8. In combination with the carrier-drum D, provided with the fixed pasting-blade F, the paste-fountain A', with roller E', vibrated upon rock-shaft B' in and out of contact with said blade at suitable intervals by means of the levers and cams, substantially as described.

9. In a folding and pasting machine, the combination, with the main carrier-drum, of a paste-fountain, a paste-blade pivoted within and revolving with said drum and caused to project beyond the periphery of the latter by suitable mechanism, substantially as described, to take paste from the paste-fountain, and mechanism, substantially as described, for then projecting the blade against the inner surface of the sheet upon the drum, substantially as and for the purposes set forth.

10. In combination with the carrier-drum, provided with the grippers G, the paste-blade K, adjustable on the arc of said drum, substantially as shown and described.

11. In combination with the drum, the grippers, the creasing-blade, and the pasting-blade, the said blades being adjustable with relation to the grippers and with each other, substantially as set forth.

12. In combination with the carrier-drum D and the adjustable arms U', carrying paste-blade K, the adjusting-box B', substantially as shown and described.

13. The combination of the adjustable paste-blade K, its bar $v'$, bell-crank $w'$, cam-roller $y'$, spring-bar $A^3$, and cams $z'$ and $B^3$, all as and for the purpose specified.

14. In a folding-machine, the combination, with the two coacting folding-rollers having steel ends, of a trimming-blade constructed, arranged, and operated substantially as described.

15. In combination with the folding-rollers, the rotating circular trimming-blade U, arranged at the end of the rollers to cut the sheet about opposite to the bite of the rollers, as and for the purpose specified.

16. In combination with the folding-rollers and trimmer-blade U, the adjustable box W, whereby the rollers (or sections thereof) and the trimmer may be simultaneously adjusted to suit the different sizes of sheets to be trimmed, substantially as described.

17. In combination with the folding-rollers, the trimmer U, secured to a hollow journal $m$ by means of a bolt Y, passing through the latter, and a nut $n$, substantially as shown and described, whereby the trimmer may be readily removed and replaced, substantially as specified.

18. In combination with the trimmer U, the folding-rollers provided with the biting or contact collars V, for the purpose of firmly holding the folded sheet as it passes beween the rollers and for the trimmer to shear against, substantially as shown and described.

19. In a paper-folding machine, the combination, with one pair of folding-rollers, of two pairs of folding-rollers, arranged one on each side of the former, together with suitable conveying mechanisms whereby the sheet may be folded in or out, substantially as shown and set forth.

20. In combination with the rollers 2 2 and transverse rollers 3 3, the double fourth pair of rollers 4 4, adapted to be used for controlling the position of the title-page, substantially as described.

21. In combination with the feed-table and the main drum provided with devices for gripping the sheets, the treadle and devices for connecting it with the feed-table, whereby the latter may be raised to lift the sheets away from said gripping mechanism, substantially as shown and described.

In testimony whereof we have hereunto affixed our signatures this 15th day of September, A. D. 1882.

CYRUS CHAMBERS, JR.
WILLIAM MENDHAM.
THORWALD C. DAMBORG.

Witnesses:
MARY P. CHAMBERS,
S. B. CHAMBERS,
JAMES R. MAGUIRE.